June 7, 1966 R. F. LEASK 3,254,674
ROTARY SERVO VALVE
Filed Aug. 4, 1964 4 Sheets-Sheet 1

INVENTOR
RICHARD F. LEASK
BY James and Franklin
ATTORNEYS

June 7, 1966　　　R. F. LEASK　　　3,254,674
ROTARY SERVO VALVE
Filed Aug. 4, 1964　　　　　　　　　　　　4 Sheets-Sheet 2
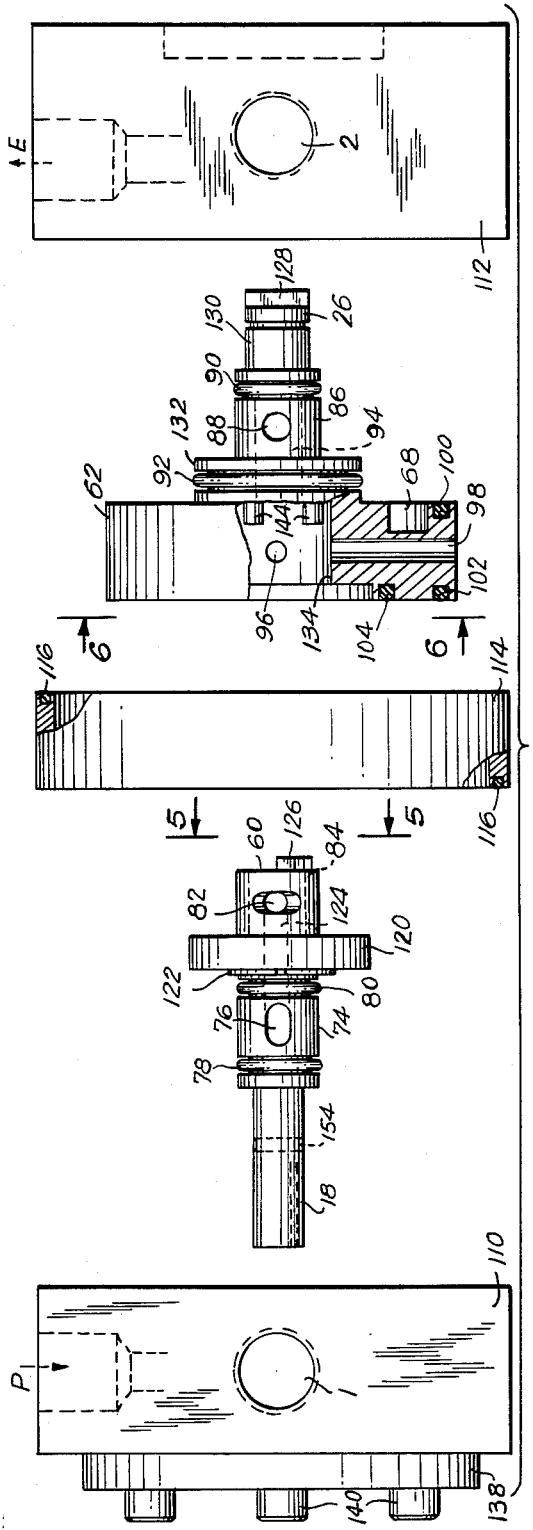
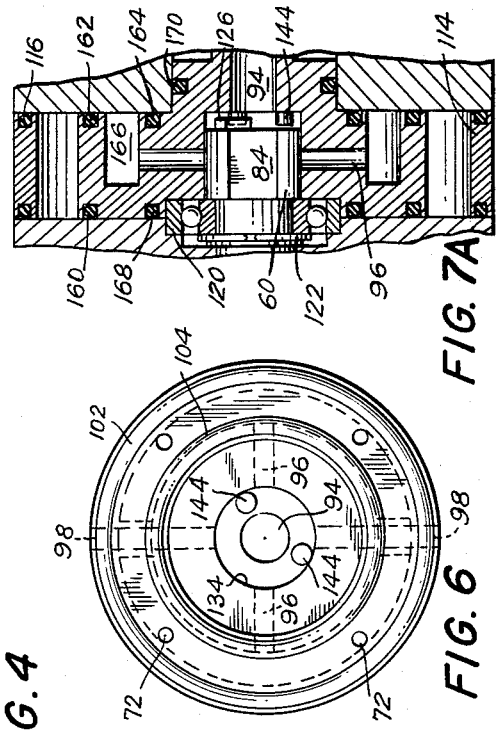
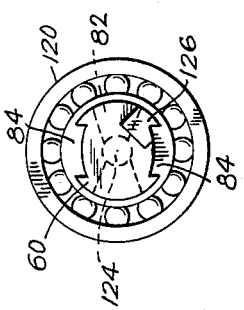
INVENTOR
RICHARD F. LEASK
BY James and Franklin
ATTORNEYS June 7, 1966  R. F. LEASK  3,254,674
ROTARY SERVO VALVE
Filed Aug. 4, 1964  4 Sheets-Sheet 3

INVENTOR
RICHARD F. LEASK
BY James and Franklin
ATTORNEYS

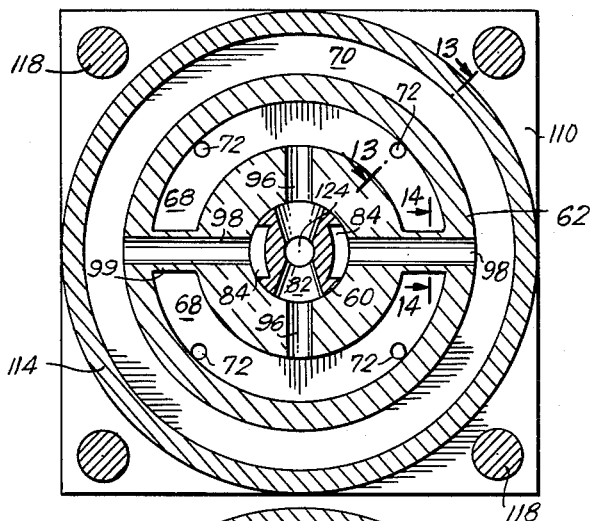

United States Patent Office 3,254,674
Patented June 7, 1966

3,254,674
ROTARY SERVO VALVE
Richard F. Leask, Hanover, N.J., assignor to Airoyal Engineering Company, Roseland, N.J., a corporation of New Jersey
Filed Aug. 4, 1964, Ser. No. 387,436
14 Claims. (Cl. 137—625.23)

This invention relates to servo valves, and more particularly to rotary servo valves.

Rotary servo valves are already known. They are usually a four-way valve which controls a double-acting actuator, with a feedback to the valve. In null position all four ports are blocked. When handling very high-pressure fluid, large elaborate thrust bearings have been needed for the shafts or spools in an effort to reduce friction. Considerable length has been needed in axial direction.

The general object of the present invention is to provide an improved rotary servo valve. A more particular object is to provide such a valve which is hydraulically balanced with respect to high pressure.

Another object is to provide a valve which is tolerant of rather than sensitive to dirt, so that the valve may be used in an open hydraulic system, instead of requiring a special closed circuit of refined liquid for the servo control alone.

Still another object is to provide a valve having concentric porting, so that the valve is compact and sturdy.

To accomplish the foregoing general objects, and other more specific objects which will hereinafter appear, my invention resides in the rotary servo valve elements and their relation one to another, as are hereinafter more particularly described in the following specification. The specification is accompanied by drawings in which:

FIG. 4 is an exploded view showing the main parts of the valve separated from one another;

FIG. 5 is an end view of the control shaft looking in the direction of the arrows 5—5 in FIG. 4;

FIG. 6 is an end view of the rotor of the feedback shaft looking in the direction of the arrows 6—6 of FIG. 4;

FIG. 7A is a fragmentary cross-section corresponding to the middle portion of FIG. 7, but showing a modified disposition of O rings for better hydraulic balance;

FIGS. 10, 11 and 12 are transverse sections taken approximately on the line 10—10 of FIG. 7;

FIG. 13 is a fragmentary section taken on the line 13—13 of FIG. 10;

FIG. 14 is a fragmentary section taken on the line 14—14 of FIG. 10; and

FIG. 15 is a fragmentary section corresponding to the left end of FIG. 7, but showing the addition of external stop or limit means.

Figure 1:
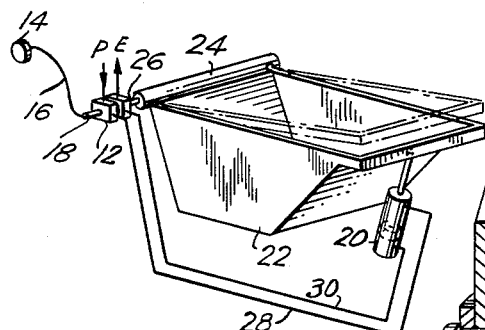
FIG. 1 is a perspective view showing one application of the rotary servo valve.

Referring to the drawing, and more particularly to FIG. 1, the rotary servo valve is indicated at 12. A manual control 14 is connected by a shaft 16 to the control shaft 18 of the valve. This has a pressure port P which is connected to a source of high-pressure hydraulic fluid, and an exhaust port E which is connected to a tank or reservoir for return. The valve 12 is being used to control an actuator 20 which tilts or adjusts the angular position of a bucket 22, this being pivotally mounted at 24. The part 24 is connected to the feedback shaft 26 of the servo valve. The connections 28 and 30 lead from the first and second actuator ports of the servo valve to the ends of the actuator 20. If the control 14 is turned slightly, the actuator 20 is energized to tilt the bucket 22 in the same direction; and when it has tilted the desired amount, the feedback shaft 26 reaches the new position of control shaft 18. This is a null position in which all ports are blocked, and the bucket 22 is locked in its new position.

Figure 2:
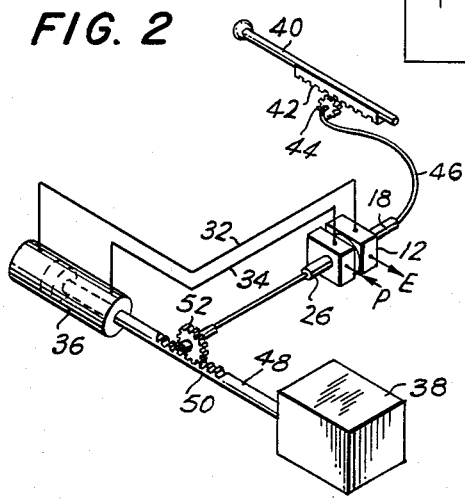
FIG. 2 is a perspective view showing another application of the valve.

Referring now to FIG. 2, the servo valve 12 again has pressure and exhaust ports P and E and again is connected to an actuator. In the present case, the ports of the valve are connected by pipes 32 and 34 to the ends of actuator 36 which moves a load or machine part, here symbolized at 38. The amount of motion to be given the load 38 is controlled by a manually movable rod 40, carrying a gear rack 42, turning pinion 44, which through a shaft 46 turns the control shaft 18 of valve 12. For purpose of feedback the actuator rod 48 has a gear rack meshing with a gear 52 which turns the feedback shaft 26 of the servo valve. This arrangement differs from FIG. 1 in that a linear motion controls a linear motion. It also differs in showing that the control and feedback shafts may turn one or more revolutions, and are not limited to a fraction of a revolution.

The construction of the servo valve may be preliminarily described with reference to FIG. 3. The valve comprises a housing having pressure port P, exhaust port E, a first actuator (or cylinder) port marked 1, and a second actuator (or cylinder) port marked 2. The control shaft 18 and feedback shaft 26 are disposed rotationally in axial alignment in the housing. The control shaft has a valve plug 60 with passages leaving four lands in quadrature spacing around the plug. The feedback shaft 26 has a rotor 62 of larger diameter which is hollowed or recessed to seat the plug 60, and which has four radial passages 96 and 98 arranged in quadrature. There are additional means or passages connecting the plug passages to the pressure and exhaust ports P and E, and there are additional means or passages connecting the rotor passages 96 and 98 to the actuator ports 1 and 2. These connections are maintained during rotation of the shafts, as by means of annular passages indicated at 64, 66, 68 and 70. There are additional passages 72 which help keep the shafts in hydraulic balance, in order to minimize friction even when the hydraulic fluid that is being controlled is under very high pressure. The shafts have a plurality of seals, preferably O rings received in grooves, which serve to isolate the high pressure passages from the low pressure or exhaust passages.

Considered in somewhat greater detail, the pressure port P leads to a pressure annulus 64. The exhaust port E leads to an exhaust annulus 66. The annulus 70 is an outer annulus of large diameter located between the pressure and exhaust annuli, which are of much smaller diameter.

The control shaft 18 has what may be termed an input barrel 74 in addition to the valve plug 60 previously mentioned. Barrel 74 has radial passages or a diametrical passage 76, and seals, preferably O rings 78 and 80 on each side of passage 76. The valve plug 60 has a diametrical passage 82, and also two axially directed channels 84. The four lands, spaced in quadrature around the plug 60, are located between the ends of diametrical passage 82 and the channels 84. Not visible in FIG. 3, but shown in other figures, is an axial passage through the control shaft connecting the diametrical passages 76 and 82. The ends of this axial passage are closed.

The feedback shaft 26 has what may be termed an exhaust barrel, which in turn carries the rotor 62. The exhaust barrel 86 has radial passages or a diametrical passage 88, and has seals (preferably O rings) 90 and 92 on each side. There is also an axial passage 94 leading from diametrical exhaust passages 88 to the hollow seat in rotor 62, this seat being deeper than the valve plug 60. The resulting space at the end of the plug provides flow communication with the two channels 84 of the valve plug.

The rotor 62 has the four radial passages arranged in quadrature, and on one face it has the inner annulus 68 previously referred to. FIG. 3 shows a short radial passage 96 leading to the inner annulus 68, and there is another like it on the opposite side. FIG. 3 also shows a long radial passage 98 which leads to the outer annulus 70, and there is another like it extending in opposite direction. There are seals on the side faces of the rotor, in this case O rings 100, 102, and 104, which seal apart the inner and outer annuli 68 and 70.

Figure 3:
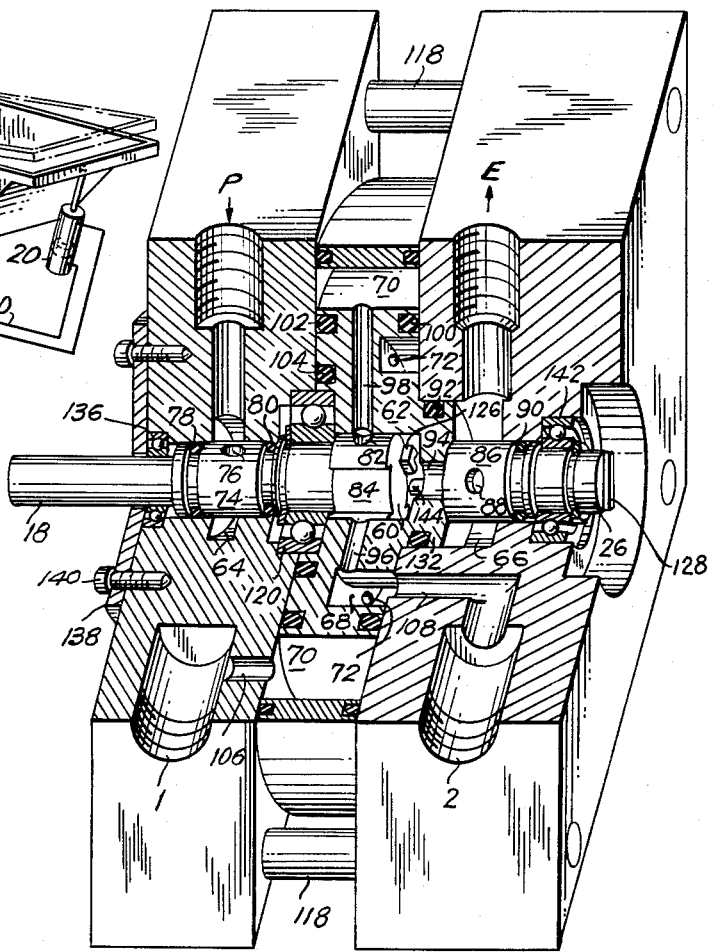
FIG. 3 is a cutaway perspective view showing the internal mechanism of the valve.

FIG. 3 also shows how actuator port 1 is connected to the outer annulus 70 by a passage 106, and actuator port 2 is connected to the inner annulus by a passage 108.

The effect of relative rotation of the plug and rotor may be described with reference to FIGS. 10, 11 and 12. Referring first to FIG. 11, the plug 60 is in null or shut-off position relative to its surrounding rotor 62. The diametrical passage 82 and the channels 84 of the plug are all located between the radial passages 96 and 98 of the rotor. Differently expressed, the four lands of the plug 60 are located exactly at and close or block the four radial passages 96 and 98. The actuator (such as the cylinder 20 in FIG. 1 or the cylinder 36 in FIG. 2) is then locked in position, and there is no movement.

In FIG. 10 the plug 60 has been turned 45° in clockwise direction, thus connecting the diametrical high pressure passage 82 to the short passages 96 of the rotor, which in turn connect with the inner annulus 68 (and so to actuator port 2 as shown in FIG. 3). The exhaust channels 84 register with the long rotor passages 98, which connect with the outer annulus 70 (and so to actuator port 1 as shown in FIG. 3). This causes the actuator to operate, and its operation, by reason of the feedback connection, turns the rotor 62 in following or clockwise direction, until the null point again is reached.

Referring now to FIG. 12, the control shaft and plug 60 have been turned in counterclockwise direction about 45° from the position shown in FIG. 11, thus bringing the high pressure passage 82 into alignment with the long rotor passages 98, and so to the outer annulus 70 (which connects to actuator port 1 as shown in FIG. 3). At the same time, the exhaust channels 84 register with the short rotor passages 96, which lead into the inner annulus 68 (and so to the actuator port 2 as shown in FIG. 3).

In FIGS. 10 and 12 the relative rotation of the control and feedback shafts has been exaggerated for the sake of clarity. In FIG. 11 the lands just block the rotor passages, and even a slight movement in clockwise or counterclockwise direction immediately causes appropriate movement of the actuator, and a follow-up movement of the feedback shaft. The large displacements shown between FIGS. 10, 11 and 12 would rarely occur, and indeed in order to prevent incorrect phase relation between the shafts, they are preferably provided with a phase stop to limit their relative movement, and this limit is usually made less than 90°, say at most 80°.

The structure may be further described with reference to FIG. 4, in which the parts have been separated. The housing of the valve is in this case made up of a "control" end plate or block 110, a "feedback" end plate or block 112, and a housing ring 114 therebetween. The plates 110 and 112 are preferably square, thereby leaving the corner portions open to receive shoulder bolts (not shown) which pull the three parts of the housing together. The edges of ring 114 are preferably grooved and fitted with O rings 116, so that the parts are sealed when drawn together by the four corner bolts. Although these are not shown in FIG. 4, they may be seen at 118 in FIGS. 3 and 8–10.

Reverting to FIG. 4, the control shaft comprises a spindle portion 18, the cylindrical intermediate part 74 here referred to for convenience as a barrel, and the valve plug 60 which has the diametrical passage 82 and the channels 84 previously described. The barrel 74 is grooved to receive the seals or O rings 78 and 80 which confine the high-pressure fluid to the barrel portion of the shaft. A ball bearing is mounted on the shaft at 120, and is held against axial movement by the plug 60 on one side, and a snap ring 122 received in a mating groove on the other side.

The control shaft may be machined out of a single piece of metal; the axial passage 124 is drilled from one end (preferably the right end as viewed in FIG. 4); and the right end of the passage then is plugged solidly, as by brazing. The control shaft is completed by means of an abutment or stop 126 formed at its right or inner end, this being used to limit relative rotation of the two shafts.

The feedback shaft comprises a spindle or connecting portion 26, which may be cut away to leave a diametrical key 128, or otherwise arranged for connection to the part or the mechanism being moved by the actuator. It receives a ball bearing at 130, this bearing being omitted in FIG. 4, but shown in FIG. 7 at 142. The cylindrical part or barrel 86 has a diametrical exhaust passage 88. The shaft is increased in diameter at 132 as a step in reaching the relatively large-diameter rotor 62, and to make it easier to hollow out the cylindrical seat 134 which receives the valve plug 60 of the control shaft. The exhaust section or barrel 86 is sealed by means of O rings 90 and 92, the latter being conveniently located in the intermediate diameter step 132. It will be seen in FIGS. 3 and 7 that the exhaust annulus 66 may be formed by a continuation of the diameter of step 132. This is convenient but not important.

Reverting to FIG. 4, the inner annulus 68 of the rotor is formed in the right face of the rotor 62, and is sealed between O rings 92 and 100. An appropriate area at the opposite side of the rotor is sealed between concentric O rings 102 and 104, and is connected to annulus 68 to help axial balance. In the present case there are four such balance holes, shown at 72 in FIGS. 10, 11 and 12. One of these holes is shown in the fragmentary section of FIG. 13. It extends from the inner annulus 68 to the left wall of the rotor 62 between the O rings 102 and 104. FIG. 13 also shows the housing ring 114 with its O rings 116 bearing against the end plates 110 and 112.

Reverting to FIG. 4, the short and long radial passages 96 and 98 are located in quadrature, as previously explained. There is no communication therebetween because the long passages 98 are sealed from the inner annulus 68, and the metal of the rotor is thickened at passages 98 for this purpose. This will be seen in FIG. 14, which is a fragmentary section on line 14—14 of FIG. 10, and shows rotor 62 with inner annulus 68. The back wall of the rotor is thickened radially at 99 to accommodate the long radial passage 98. No such problem arises with the short passages 96 which lead directly into the inner annulus 68, as is clearly shown in FIGS. 3 and 10–12.

Figure 7:
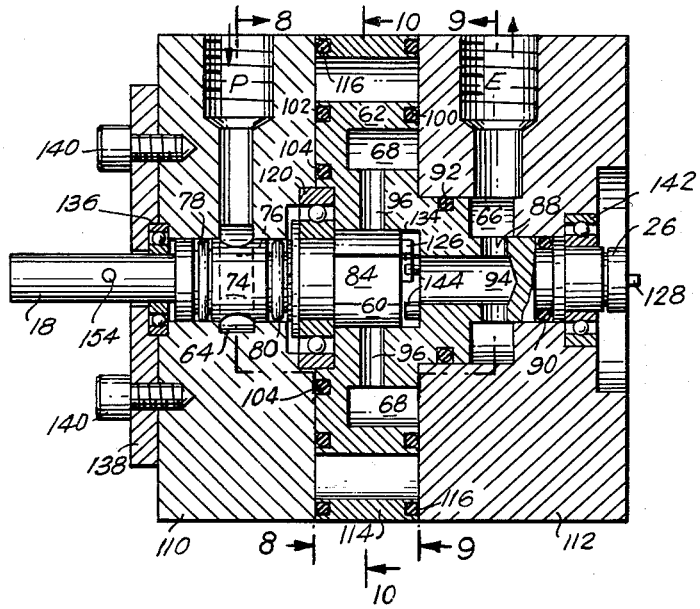
FIG. 7 is a longitudinal section through the axis of the assembled valve.

The separated parts of FIG. 4 are shown assembled in FIG. 7. The end plates 110 and 112 abut the housing ring 114. The control shaft 18 passes through end plate 110 and is carried by ball bearing 120, preferably supplemented by another smaller ball bearing 136. Bearing 136 may be secured in position by means of a plate 138 held by screws 140. The input or pressure barrel 74 is located at the pressure annulus 64, which in turn communicates with pressure port P. This is clearly shown in FIG. 8.

The feedback shaft 26 (FIG. 7) passes through end plate 112, and is carried by ball bearing 142. The diametrical exhaust passage 88 communicates with the exhaust annulus 66 which, in turn, connects with the exhaust port E. This is clearly shown in FIG. 9. The valve plug 60 (FIG. 7) is received in valve seat 134 formed in rotor 62, which rotor is integral with the feedback shaft. The rotor 62 is located between the end plates 110 and 112 and within the housing ring 114.

Valve plug 60 is substantially shorter in axial dimension than the receptive seat 134, thereby leaving a flow space at the right end of the valve plug. This space connects the axial passage 94 of the feedback shaft to the axially directed channels 84 of the valve plug. The same end space may be utilized to house the stop projection 126 cooperating with the stop pins 144. The inner annulus 68 is sealed between O rings 100 and 92.

Figure 8:
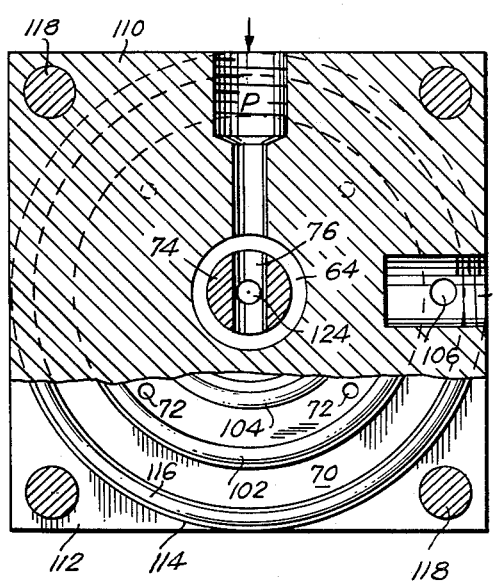
FIG. 8 is a transverse section taken approximately on the stepped line 8—8 of FIG. 7.
Figure 9:
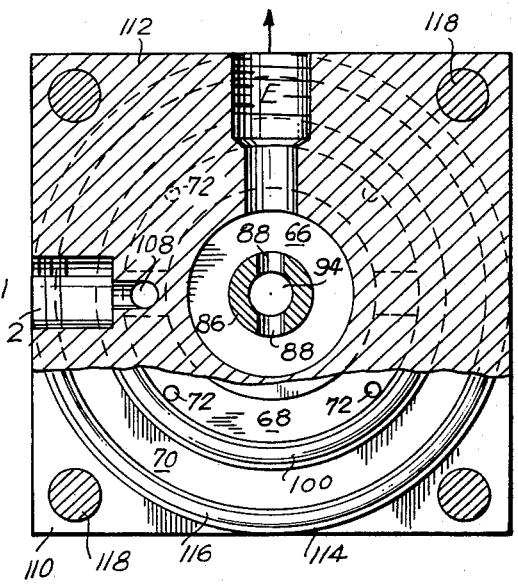
FIG. 9 is a transverse section taken approximately on the stepped line 9—9 of FIG. 7.

FIGS. 7, 8 and 9 may be referred to for the hydraulic or flow connections. FIG. 8 shows the pressure port P leading to pressure annulus 64, and so to diametrical passage 74 and axial passage 124. This figure also shows how the outer annulus 70 is connected by a passage 106 to the actuator port 1. It also shows the O rings 102 and 104 of the rotor, with the hydraulic balance holes 72 therebetween. It further shows the O ring 116 of the housing ring 114 for sealing against the end plate 110. The upper part of the latter is shown in section. The rotor and housing ring are visible below the section. The corners of the other or remote end plate 112 become visible outside the housing ring 114.

FIG. 9 shows how exhaust port E is connected directly to exhaust annulus 66 which surrounds and communicates with the diametrical passage 88 of the feedback shaft, and so to the axial passage 94 of the feedback shaft. This leads to the valve seat of the rotor, as previously explained, and as is clearly shown in FIG. 7. FIG. 9 also shows how a passage 108 leads from the inner annulus 68 to the actuator port 2. It further shows the balance holes 72 which connect the two sides of the rotor for hydraulic balance. It also shows O ring 100 of the rotor and O ring 116 of the housing ring 114. The end plate 112 is cross hatched, while at the bottom the corners of the remote end plate 110 are visible outside the housing ring 114.

The phase stops are shown in FIGS. 5 and 6. The projection 126 is shown in FIG. 5, and the two stop pins 144 are shown in FIG. 6. Projection 126 is received between pins 144, and the permissible relative motion is limited to a suitable amount which theoretically may be 90° (as shown in FIGS. 10 and 12) but which is preferably less, say no more than 80°.

The phase stop concerns relative movement and not overall movement. Thus in the arrangement of FIG. 2 the rotation of the servo valve may be several complete revolutions. However, in an arrangement such as that shown in FIG. 1 it may be desired to limit the total angular movement, and this may be done by adding a limit stop to the control shaft at the control end of the valve. This is shown in FIG. 15, in which the control shaft 18 is provided with a diametrical stop pin 150 cooperating with a stationary pin 152. The motion then would be limited to somewhat less than 180°. By providing a radial pin instead of a diametrical pin, the motion would be limited to somewhat less than 360°. By providing two stationary stop pins 152 spaced apart a desired amount, the motion may be limited to as small an angle as may be desired. In FIG. 15, the plate 138 corresponds to that shown in FIGS. 3, 4, and 7. FIG. 4 and FIG. 7 also show the hole 154 which receives the stop pin 150 when such a stop is desired.

The balance holes 72 greatly reduce hydraulic unbalance and therefore reduce friction. However, in the specific arrangement shown, the areas subjected to pressure on both sides of the rotor are somewhat unequal. FIG. 7A corresponds to the middle portion of FIG. 7, but shows a modified arrangement of seals or O rings. In this case, the outer O rings 160 and 162 may be located at the same radius as before. An additional O ring 164 has been added beneath the annulus 166, to match the O ring 168 on the opposite face of the rotor. The O rings 164 and 168 are preferably located at like radius, and thus the areas subjected to pressure on both faces of the rotor are equal and substantially in balance. Balance holes are used as before.

Another way to accomplish the same substantial balance is to eliminate the inner O ring 104 (FIG. 7), thus permitting the same pressure to apply all the way from O ring 102 to O ring 80. At the same time the step in the feedback shaft is reduced in diameter at O ring 92, to a diameter approximating that of O ring 80. The same pressure then extends from O ring 100 to O ring 92 on one side, as from O ring 102 to O ring 80 on the other side.

In FIG. 11, and as so far described, the four lands of the valve plug equal the width of the passages controlled thereby. In practice, this relation may be changed, as is already known in this art, and the structure may be slightly modified to provide underlap, or full lap, or overlap. The control element is usually made full lap. However, it may be made underlap, in which case it is more accurately and more sensitively responsive, but at the disadvantage of some leakage of hydraulic fluid. It may be made overlap, which prevents leakage, but at the disadvantage of a dead band and a reduction in accuracy and sensitivity.

The ports which are acted on by the plug, that is, the inner ends of the short and long passages 96 and 98 of the rotor, may be given a special shape. For example, they may be diamond or oval or teardrop in shape, and the shape may be designed to provide a square or other exponential law, or logarithmic law, in the response of the servo valve. They may be shaped to provide either acceleration or deceleration of the actuator which is being controlled by the servo valve.

The lands and the rotor passages are conveniently in quadrature, but this is not essential. The long passages should be diametrical, for balance. The short passages should be diametrical, for balance. However, the long and short passages might be at an angle somewhat different from 90° provided the lands similarly differ from 90°.

It is believed that the construction and operation of my improved servo valve, as well as the advantages thereof, will be apparent from the foregoing detailed description. There is axial balancing with respect to the high pressure fluid, and this is extremely important because the pressure being controlled may be very high, say three thousand pounds per square inch. In contrast, a balance in respect to the exhaust or return tank pressure is unimportant because that pressure is low and negligible. The hydraulic balance that is provided eliminates the need for large elaborate thrust bearings.

Most servo valves are sensitive to dirt in the fluid, and require a ten-micron filtration. The present valve wipes dirt away and is tolerant of dirt up to, say one hundred micron filtration. An ordinary open hydraulic system is not held to ten micron filtration, and previous systems usually employ a special closed circuit of refined liquid for the servo control alone. In contrast, the present valve may be piped into the regular open hydraulic system, using and controlling the regular hydraulic fluid which is anyway distributed around the shop.

The concentric configuration of the porting provides a compact valve envelope and efficient flow with low pressure drop. The shafts are very short in length relative to the valve flow capacity, which prevents distortion such as usually accompanies increased length. The servo action is unidirectional, so that the valve does not oscillate or hunt. The null conditions of the valve are easily varied because considerable space is available for overlap should that be wanted. Acceleration and deceleration of the actuator can be provided by appropriately shaping the orifices of the valve to provide the desired results. This may be done for example by varying the orifice shape at the inner ends of the four radial passages of the rotor portion of the feedback shaft.

It will be apparent that while I have shown and described the invention in a preferred form, changes may be made in the structure shown without departing from the scope of the invention as sought to be defined in the following claims. In the claims the reference to the lands and rotor passages being arranged in quadrature is merely for convenience of visualization, and is not intended to exclude two diametrical passages which are at an angle somewhat different from 90°, with mating lands, as explained above.

I claim:

1. A rotary servo valve comprising a housing having a pressure port, an exhaust port, a first actuator port, and a second actuator port, a control shaft and a feedback shaft disposed rotationally in axial alignment in said housing, said control shaft having a valve plug with passages leaving four lands in quadrature spacing around said plug, said feedback shaft having a rotor hollowed to seat the plug and having four radial passages arranged in quadrature, means connecting the plug passages to two of the ports, and means connecting the rotor passages to the other two ports, said connections being maintained during rotation of the shafts, and additional passages arranged to reduce hydraulic unbalance in order to reduce friction.

2. A rotary servo valve comprising a housing having a pressure port, an exhaust port, a first actuator port, and a second actuator port, a control shaft and a feedback shaft disposed rotationally in axial alignment in said housing, said control shaft having a valve plug with passages leaving four lands in quadrature spacing around said plug, said feedback shaft having a rotor of larger diameter hollowed to seat the plug and having four radial passages arranged in quadrature in a single plane outside the plug, means connecting the plug passages to the pressure and exhaust ports, and means connecting the rotor passages to the actuator ports, said means including four annular passages whereby said connections to said ports are maintained during rotation of the shafts.

3. A rotary servo valve comprising a housing having a pressure port, an exhaust port, a first actuator port, and a second actuator port, a control shaft and a feedback shaft disposed rotationally in axial alignment in said housing, said control shaft having a valve plug with passages leaving four lands in quadrature spacing around said plug, said feedback shaft having a rotor of larger diameter hollowed to seat the plug and having four radial passages arranged in quadrature in a single plane outside the plug, means connecting the plug passages to the pressure and exhaust ports, and means connecting the rotor passages to the actuator ports, said means including four annular passages whereby said connections to said ports are maintained during rotation of the shafts, and additional passages arranged to reduce hydraulic unbalance in order to reduce friction.

4. A rotary servo valve comprising a housing having a pressure port, an exhaust port, a first actuator port, and a second actuator port, a control shaft and a feedback shaft disposed rotationally in axial alignment in said housing, said control shaft having a valve plug with passages leaving four lands around said plug, said feedback shaft having a rotor hollowed to seat the plug and having four radial passages outside the plug, means connecting the plug passages to two of the ports, means connecting the rotor passages to the other two ports, said connections being maintained during rotation of the shafts, additional passages arranged to reduce hydraulic unbalance in order to reduce friction, and a plurality of O rings received in grooves in said shafts and serving to isolate the high pressure passages from the exhaust pressure passages.

5. A rotary servo valve comprising a housing having a pressure port, an exhaust port, a first actuator port, and a second actuator port, a control shaft and a feedback shaft disposed rotationally in axial alignment in said housing, said control shaft having a valve plug with passages leaving four lands around said plug, said feedback shaft having a rotor of larger diameter hollowed to seat the plug and having four radial passages outside the plug, means connecting the plug passages to the pressure and exhaust ports, means connecting the rotor passages to the actuator ports, said means including annular passages whereby said connections to said ports are maintained during rotation of the shafts, and a plurality of O rings received in grooves at said shafts and rotor to isolate the high pressure passages from the exhaust passages.

6. A rotary servo valve comprising a housing having a pressure port, an exhaust port, a first actuator port, and a second actuator port, a control shaft and a feedback shaft disposed rotationally in axial alignment in said housing, said control shaft having a valve plug with passages leaving four lands in quadrature spacing around said plug, said feedback shaft having a rotor of larger diameter hollowed to seat the plug and having four radial passages arranged in quadrature outside the plug, means connecting the plug passages to the pressure and exhaust ports, and means connecting the rotor passages to the actuator ports, said means including annular passages whereby said connections to said ports are maintained during rotation of the shafts, and additional passages arranged to reduce hydraulic unbalance in order to reduce friction.

7. A rotary servo valve comprising a housing having a pressure port, an exhaust port, a first actuator port, and a second actuator port, a control shaft and a feedback shaft disposed rotationally in axial alignment in said housing, said control shaft having a valve plug with passages leaving four lands in quadrature spacing around said plug, said feedback shaft having a rotor of larger diameter hollowed to seat the plug and having four radial passages arranged in quadrature outside the plug, means connecting the plug passages to the pressure and exhaust ports, and means connecting the rotor passages to the actuator ports, said means including annular passages whereby said connections to said ports are maintained during rotation of the shafts, and additional passages arranged to reduce hydraulic unbalance in order to reduce friction, and a plurality of O rings received in grooves at said shafts and rotor to isolate the high pressure passages from the exhaust passages.

8. A rotary servo valve comprising a housing with a pressure port leading to a pressure annulus, an exhaust port leading to an exhaust annulus spaced axially from the pressure annulus, an outer annulus of larger diameter between said pressure and exhaust annuli, a control shaft and a feedback shaft disposed rotationally in axial alignment in said housing, said control shaft having an input barrel and a valve plug, said input barrel having radial passages for flow connection to the pressure annulus, said valve plug having a diametrical passage, and having two axially directed channels on opposite sides between the ends of the diametrical passage, leaving four lands in quadrature spacing around said plug, said control shaft having an axial passage connecting said radial and said diametrical passages, said feedback shaft having an exhaust barrel carrying at its inner end a rotor hollowed to seat the plug of the control shaft, said exhaust barrel having radial passages for flow connection to the exhaust annulus, an axial passage from the radial passages to the seat at the end of the valve plug and thence to the channels of the plug, said rotor being located within the outer annulus and having four radial passages arranged in quadrature, and having an inner annulus on one face, two of the four radial passages being short and leading from the seat to the inner annulus, the other two radial passages being long and leading from the seat to the outer annulus, a first actuator port in said housing connected to the outer annulus, and a second actuator port in said housing connected to the inner annulus.

9. A rotary servo valve comprising a housing with a pressure port leading to a pressure annulus, an exhaust port leading to an exhaust annulus spaced axially from the pressure annulus, an outer annulus of larger diameter between said pressure and exhaust annuli, a control shaft and a feedback shaft disposed rotationally in axial alignment in said housing, said control shaft having an input barrel and a valve plug, said input barrel having radial passages for flow connection to the pressure annulus, said valve plug having a diametrical passage, and having two axially directed channels on opposite sides between the ends of the diametrical passage, leaving four lands in quadrature spacing around said plug, said control shaft having an axial passage connecting said radial and said diametrical passages, said feedback shaft having an exhaust barrel carrying at its inner end a rotor hollowed to seat the plug of the control shaft, said exhaust barrel having radial passages for flow connection to the exhaust annulus, an axial passage from the radial passages to the seat at the end of the valve plug and thence to the channels of the plug, said rotor being located within the outer annulus and having four radial passages arranged in quadrature, and having an inner annulus on one face, and having a plurality of short axial balance holes leading from the inner annulus to the opposite face, two of the four radial passages being short and leading from the seat to the inner annulus, the other two radial passages being long and leading from the seat to the outer annulus, a first actuator port in said housing connected to the outer annulus, and a second actuator port in said housing connected to the inner annulus, and phase stop means between said control and feedback shafts to limit relative rotation to less than 90°.

10. A rotary servo valve comprising a housing with a pressure port leading to a pressure annulus, an exhaust port leading to an exhaust annulus spaced axially from the pressure annulus, an outer annulus of larger diameter between said pressure and exhaust annuli, a control shaft and a feedback shaft disposed rotationally in axial alignment in said housing, said control shaft having an input barrel and a valve plug, said input barrel having radial passages and seals on each side of said radial passages for flow connection to the pressure annulus, said valve plug having a diametrical passage, and having two axially directed channels on opposite sides between the ends of the diametrical passage, leaving four lands in quadrature spacing around said plug, said control shaft having an axial passage connecting said radial and said diametrical passages, said feedback shaft having an exhaust barrel carrying at its inner end a rotor hollowed to seat the plug of the control shaft, said exhaust barrel having radial passages and seals on each side of said radial passages for flow connection to the exhaust annulus, an axial passage from the radial passages to the seat at the end of the valve plug and thence to the channels of the plug, said rotor being located within the outer annulus and having four radial passages arranged in quadrature, and having an inner annulus on one face, two of the four radial passages being short and leading from the seat to the inner annulus, the other two radial passages being long and leading from the seat to the outer annulus, seals on the rotor to seal apart the inner and outer annuli, a first actuator port in said housing connected to the outer annulus, and a second actuator port in said housing connected to the inner annulus.

11. A rotary servo valve comprising a housing with a pressure port leading to a pressure annulus, an exhaust port leading to an exhaust annulus spaced axially from the pressure annulus, an outer annulus of larger diameter between said pressure and exhaust annuli, a control shaft and a feedback shaft disposed rotationally in axial alignment in said housing, said control shaft having an input barrel and a valve plug, said input barrel having a radial passage and seals on each side of said radial passage for flow connection to the pressure annulus, said valve plug having a diametrical passage, and having two axially directed channels on opposite sides between the ends of the diametrical passage, leaving four lands around said plug, said control shaft having an axial passage connecting said radial and said diametrical passages, said feedback shaft having an exhaust barrel carrying at its inner end a rotor hollowed to seat the plug of the control shaft, said exhaust barrel having a radial passage and seals on each side of the radial passage for flow connection to the exhaust annulus, an axial passage from the radial passage to the seat at the end of the valve plug and thence to the channels of the plug, said rotor being located within the outer annulus and having four radial passages around the plug, and having an inner annulus on one face, and having a pressure balance hole leading from one face of the rotor to the opposite face of the rotor, two of the four radial passages being short and leading from the seat to the inner annulus, the other two radial passages being long and leading from the seat to the outer annulus, seals on the rotor to seal apart the inner and outer annuli, a first actuator port in said housing connected to the outer annulus, and a second actuator port in said housing connected to the inner annulus.

12. A rotary servo valve comprising a housing with a pressure port leading to a pressure annulus, an exhaust port leading to an exhaust annulus spaced axially from the pressure annulus, an outer annulus of larger diameter between said pressure and exhaust annuli, a control shaft and a feedback shaft disposed rotationally in axial alignment in said housing, said control shaft having an input barrel and a valve plug, said input barrel having a radial passage and O rings on each side of said radial passages for flow connection to the pressure annulus, said valve plug having a diametrical passage, and having two axially directed channels on opposite sides between the ends of the diametrical passage, leaving four lands in quadrature spacing around said plug, said control shaft having an axial passage connecting said radial and said diametrical passages, said feedback shaft having an exhaust barrel carrying at its inner end a rotor hollowed to seat the plug of the control shaft, said exhaust barrel having a radial passage and O rings on each side for flow connection to exhaust annulus, an axial passage from the radial passage to the seat at the end of the valve plug and thence to the channels of the plug, said rotor being located within the outer annulus and having four radial passages arranged in quadrature, and having an inner annulus on one face, and having a plurality of short axial pressure balance holes leading from one face of the rotor to the opposite face of the rotor, two of the four radial passages being short and leading from the seat to the inner annulus, the other two radial passages being long and leading from the seat to the outer annulus, O rings on the rotor to seal apart the inner and outer annuli, a first actuator port in said housing connected to the outer annulus, a second actuator port in said housing connected to the inner annulus, and phase stop means between said plug and seat or between said control and feedback shafts to limit relative rotation to less than 90°.

13. A rotary servo valve comprising a housing with a pressure port leading to a pressure annulus, an exhaust port leading to an exhaust annulus spaced axially from the pressure annulus, an outer annulus of larger diameter between said pressure and exhaust annuli, a control shaft and a feedback shaft disposed rotationally in axial alignment in said housing, said control shaft having an input barrel and a valve plug, said input barrel having radial passages for flow connection to the pressure annulus, said valve plug having a diametrical passage, and having two axially directed channels on opposite sides between the ends of the diametrical passage, leaving four lands around said plug, said control shaft having an axial passage connecting said radial and said diametrical passages, said feedback shaft having an exhaust barrel carrying at its inner end a rotor hollowed to seat the plug of the control shaft, said plug being shorter than said seat and leaving a space at the end of the plug, said exhaust barrel having radial passages for flow connection to the exhaust annulus, an axial passage from the radial passages to the seat at the end of the valve plug and thence to the channels of the plug, said rotor being located within the outer annulus, and having four radial passages around the plug, and having an inner annulus on one face, and having short axial pressure balance holes leading from the inner annulus to the opposite face of the rotor, two of the four radial passages being short and leading from the seat to the inner annulus, the other two radial passages being long and leading from the seat to the outer annulus, seals on the rotor to seal apart the inner and outer annuli, a first actuator port in said housing connected to the outer annulus, and a second actuator port in said housing connected to the inner annulus.

14. A rotary servo valve comprising a housing with a pressure port leading to a pressure annulus, an exhaust port leading to an exhaust annulus spaced axially from the pressure annulus, an outer annulus of larger diameter between said pressure and exhaust annuli, a control shaft and a feedback shaft disposed rotationally in axial alignment in said housing, said control shaft having an input barrel, and a valve plug, said input barrel having radial passages and O rings on each side of said radial passages for flow connection to the pressure annulus, said valve plug having a diametrical passage, and having two axially directed channels on opposite sides between the ends of the diametrical passage, leaving four lands in quadrature spacing around said plug, said control shaft having an axial passage connecting said radial and said diametrical passages, said feedback shaft having an exhaust barrel carrying at its inner end a rotor hollowed to seat the plug of the control shaft, said plug being shorter than said seat and leaving a space at the end of the plug, said exhaust barrel having radial passages and O rings on each side for flow connection to the exhaust annulus, an axial passage from the radial passages to the seat at the end of the valve plug and thence to the channels of the plug, said rotor being located within the outer annulus and having four radial passages arranged in quadrature, and having an inner annulus on one face, and having a plurality of short axial pressure balance holes leading from the inner annulus to the opposite face of the rotor, two of the four radial passages being short and leading from the seat to the inner annulus, the other two radial passages being long and leading from the seat to the outer annulus, O rings on the rotor to seal apart the inner and outer annuli, a first actuator port in said housing connected to the outer annulus, a second actuator port in said housing connected to the inner annulus, and phase stop means between said control and feedback shafts to limit relative rotation to less than 90°, said stop means being located in the space between the end of the plug and the seat.

References Cited by the Examiner

UNITED STATES PATENTS

| | | | |
|---|---|---|---|
| 620,281 | 2/1899 | Cooper | 91—375 |
| 2,349,641 | 5/1944 | Tucker et al. | 91—375 XR |
| 2,372,710 | 4/1945 | Chisholm | 91—375 |
| 2,907,349 | 10/1959 | White | 137—625.23 |

MARTIN P. SCHWADRON, *Acting Primary Examiner.*